May 24, 1932. J. T. CESSNA, JR 1,859,958
MIXING TOOL
Filed Oct. 16, 1930
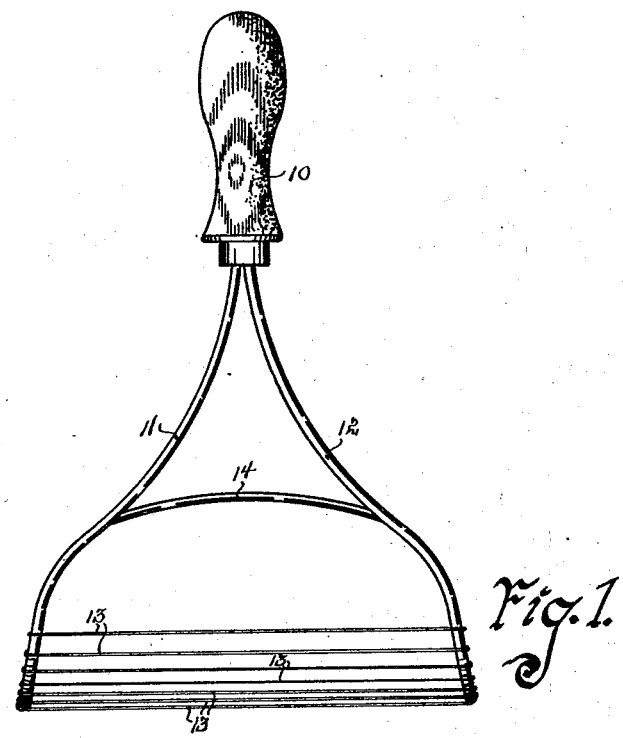
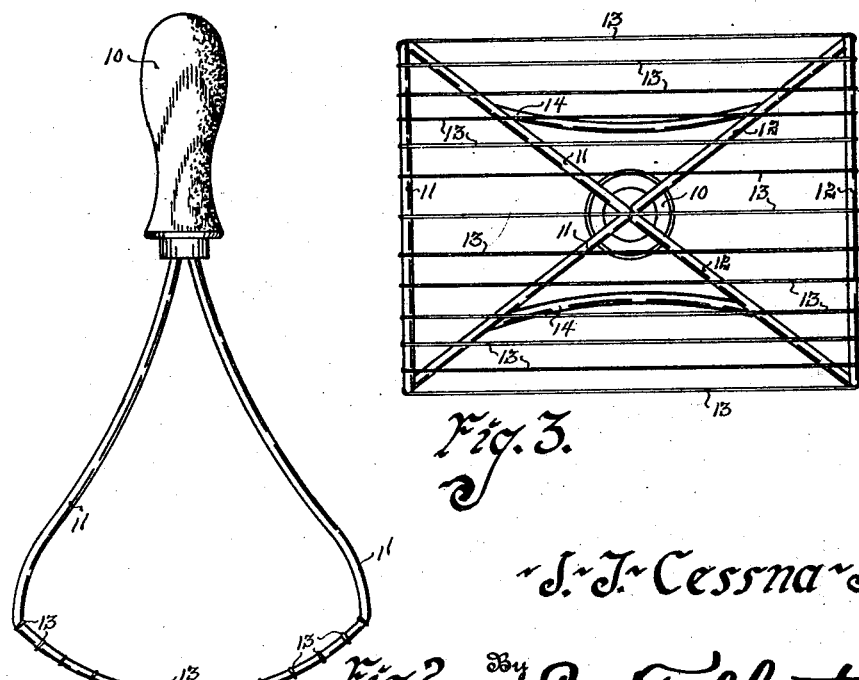
Inventor
J. T. Cessna Jr.
By M. Talbert Dick Patented May 24, 1932

1,859,958

UNITED STATES PATENT OFFICE

JOHN T. CESSNA, JR., OF AMES, IOWA

MIXING TOOL

Application filed October 16, 1930. Serial No. 489,128.

The principal object of this invention is to provide a device for the successful mixing of flour and lard or like, as required in the process of making certain edibles such as pie crusts and pastries.

A further object of this invention is to provide a manually operated device that will thoroughly mix flour and lard, one with the other, with great rapidity.

A still further object of my invention is to provide a manually operated flour and lard mixing device that requires a minimum amount of work and effort on the part of the operator.

A still further object of this invention is to provide a flour and lard, or like, mixing tool that conforms to irregular outlines of the walls and bottom of the receptacle holding the material to be mixed, thereby assuring the successful mixing of all of the contents in the receptacle.

A still further object of my invention is to provide a lard and flour mixing tool that holds the cutting and mixing wires in a taut condition.

A still further object of this device is to provide a flour and lard mixing device that does not become clogged or fouled with the material to be commingled during the mixing process.

A still further object of my invention is to provide a flour and lard mixing tool that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of my complete invention ready for use.

Fig. 2 is an end view of the device.

Fig. 3 is a bottom view of the invention and more fully illustrates its construction.

The mixing of flour and lard is a very difficult task and must be most successfully accomplished if the housewife or cook is to realize excellent pie crust or like. The approved method by domestic science instructors is to cut the lard into the flour with a knife. This procedure, of course, is very slow and tiresome. The objections to tools now on the market to supersede the slow "knife method" of mixing the flour and lard are their inability to easily cut through the material to be mixed, due to their heavy cutting members, their inability to maintain the cutting members in a taut condition and in proper relation one to the other, the difficulty in keeping them in a sanitary condition, and their tendency to clog and improperly function. I have overcome such objections as will hereinafter be appreciated.

I have used the numeral 10 to designate the handle member of the invention.

Extending downwardly from this handle member are two cutting and mixing wires supporting members 11 and 12, respectively, each of loop construction. These two loop members extend downwardly and outwardly away from each other for the greater portion of their upper lengths and then extend sharply downwardly and only slightly outwardly. The extreme bottom or center portion of each of the loop members is of circular construction as shown in Fig. 2. As shown in the drawings the lower ends of the loop members 11 and 12 will be a considerable distance apart. It is between these two center curved portions of the loop members that the cutting and mixing wires 13 extend. These wires 13 are very small in diameter and are each secured at their two ends to the two curved portions of the loop members, respectively, by any suitable means such as solder, spot welding or the like. It should here be noted that these mixing and cutting wires are comparatively close together and are parallel one with the other. The holding and supporting members 11 and 12 should be of suitable spring metal to successfully hold the cutting and mixing wires 13 tightly between them during the mixing process. This taut holding of the wires 13 is encouraged by the construction of the loop members 11 and 12, i. e., their lower portions extending downwardly and outwardly, away from each other.

By this construction when the handle 10 is pushed downwardly to force the lower end of the invention into the material to be mixed and the lower end of the invention meets resistance, the tendency of the lower ends of the device will be to spread apart from each other, thereby tightening the wires 13. The numeral 14 designates two braces between the two members 11 and 12.

To mix the flour and lard the same should be placed in a receptacle and my invention grasped by the handle 10 and manually forced downwardly and upwardly, in and through the lard and flour. Due to the construction in my invention permitting very fine cutting and mixing wires 13, the lower end of the invention will easily cut through the material to be mixed with a minimum amount of effort expended and without undesirable clogging or fouling with the material to be mixed as is experienced with mixers having cutting members of heavy construction. As the cutting and mixing wires easily pass completely through the flour and lard at each down or upward movement of the handle 10, the lard and flour will not only be successfully mixed but will be thoroughly mixed in a very short duration of time. By making the lower ends of the loop members 11 and 12 curved, the lower end of the invention will conform to odd shaped vessels holding the flour and lard to be mixed and also makes it possible to easily scrape and cut any of the lard or flour that clings to the inside wall or walls of the vessels.

Although I have described my invention as particularly adapted to the mixing of lard and flour, it may be used to equal advantage for the mixing of other materials.

By the construction of my invention as above disclosed it is easily and quickly washed and maintained in a sanitary condition.

Some changes may be made in the construction and arrangement of my improved mixing tool without departing from the real spirit and purpose of my invention, and it is my intention to cover by my claims any modified forms of structure or use of mechanical equivalents which may be reasonably included within their scope.

I claim:

1. In a device of the class described, a handle member, two duplicate one-piece loop members of spring metal extending from said handle member; said two loop members extending downwardly and outwardly away from each other and then sharply downwardly and outwardly at their lower portions in order that when said handle member is pushed downwardly and said loop members meet resistance, their tendency will be to spring apart, and a plurality of small flexible wires extending between and secured to the lower portions of said loop members.

2. In a device of the class described, a handle member, two duplicate one-piece loop members of spring metal extending from said handle member; said two loop members extending downwardly and outwardly away from each other and then sharply downwardly and outwardly at their lower portions in order that when said handle member is pushed downwardly and said loop members meet resistance, their tendency will be to spring apart, a plurality of small flexible wires extending between and secured to the lower portions of said loop members, and brace members secured to and between said loop members.

3. In a device of the class described, a handle member, two duplicate one-piece loop members extending from said handle member and having their end portions entering a common bore in said handle member; said two loop members first extending downwardly and outwardly away from each other and said handle member and then extending sharply downwardly and outwardly at their lower portions in order that when said handle member is pushed downwardly and said loop members meet resistance their tendency will be to spread apart from each other, and a plurality of small wires extending between and secured to the lower portions of said loop members.

4. In a device of the class described, a vertical handle member, two duplicate one-piece loop members having their end portions secured to the lower end of said handle member; said two loop members first extending downwardly and outwardly away from each other and said handle member and then extending sharply downwardly and outwardly at their lower portions in order that when said handle member is pushed downwardly and said loop members meet resistance their tendency will be to spread apart from each other, and a plurality of small wires extending between and secured to the lower portions of said loop members.

5. In a device of the class described, a handle member, two duplicate one-piece loop members extending independently and free of each other from said handle member; said two loop members first extending downwardly and outwardly away from each other and said handle member and then extending sharply downwardly and outwardly at their lower portions in order that when said handle member is pushed downwardly and said loop members meet resistance their tendency will be to spread apart from each other, and a plurality of small wires extending between and secured to the lower portions of said loop members.

6. In a device of the class described, a handle member, two duplicate one-piece loop members having their end portions secured to said handle member and extending free and independently of each other downwardly and outwardly away from said handle and away from each other, and a plurality of cutting wires extending between and secured to the lower portions of said loop members.

7. In a device of the class described, a handle member, two duplicate one-piece supporting members extending from said handle member; said supporting members extending first downwardly and outwardly away from said handle member and away from each other and then extending sharply downwardly and outwardly at their lower portions in order that when said handle member is pushed downwardly and said supporting members meet resistance their tendency will be to spread apart, and a plurality of fine cutting and mixing wires secured to and extending between said two supporting members.

8. In a device of the class described, a handle member, two duplicate one-piece loop members extending from said handle member and having their end portions entering a common bore in said handle member and their central portions each forming a downwardly extending curve; said two loop members first extending downwardly and outwardly away from each other and said handle member and then extending sharply downwardly and outwardly at their lower portions in order that when said handle member is pushed downwardly and said loop members meet resistance their tendency will be to spread apart from each other, and a plurality of small parallel wires extending between and secured to the lower central portions of said loop members.

JOHN T. CESSNA, Jr.